United States Patent [19]
Cartwright

[11] 4,103,142
[45] Jul. 25, 1978

[54] APPARATUS AND METHOD FOR USE IN ONE-SIDED WELDING

[76] Inventor: Frederick D. Cartwright, 506 Lake Club Apts., Lake Rd., Germiston, 1401, South Africa

[21] Appl. No.: 559,367

[22] Filed: Mar. 17, 1975

[30] Foreign Application Priority Data

| Mar. 28, 1974 | [ZA] | South Africa | 74/0803 |
| May 9, 1974 | [ZA] | South Africa | 74/2953 |
| Aug. 9, 1974 | [ZA] | South Africa | 74/5099 |
| Aug. 23, 1974 | [ZA] | South Africa | 74/5410 |

[51] Int. Cl.² ............................................ B23K 9/02
[52] U.S. Cl. .................................. 219/136; 219/160; 228/50
[58] Field of Search ............... 219/60 R, 60 A, 102, 219/104, 106, 110, 121 EB, 121 EM, 121 L, 121 LM, 74, 75, 124, 125 PL, 137, 155, 158, 159, 160; 228/45, 50

[56] References Cited

U.S. PATENT DOCUMENTS

| 1,806,949 | 5/1931 | Palm | 219/60 A X |
| 1,806,954 | 5/1931 | Schmitz, Jr. | 219/60 R X |
| 1,869,351 | 7/1932 | Lincoln | 219/60 R |
| 1,871,326 | 8/1932 | Koch | 219/60 R |
| 2,294,439 | 9/1942 | Bagley | 228/50 X |
| 3,227,349 | 1/1966 | Frederick | 228/50 X |
| 3,240,913 | 3/1966 | Schubert | 219/60 R |
| 3,335,254 | 8/1967 | Vilkas et al. | 219/60 A |
| 3,432,915 | 3/1969 | Doyle | 228/50 X |
| 3,483,352 | 12/1969 | Schollhammer | 219/60 A X |
| 3,575,574 | 4/1971 | Almqvist | 219/160 |
| 3,748,432 | 7/1973 | Bosworth et al. | 219/121 EB |
| 3,778,581 | 12/1973 | Denny | 219/110 X |

OTHER PUBLICATIONS

Dr. K. Teraland, Dr. M. Arikawa, "Recent Developments in One-Side Automatic Welding," 1969, p. 16.

Primary Examiner—J. V. Truhe
Assistant Examiner—Clifford C. Shaw
Attorney, Agent, or Firm—Stevens, Davis, Miller & Mosher

[57] ABSTRACT

Apparatus is provided for use in welding together work pieces along a weld line including backing locating means which applies progressively a backing strip over the weld line in advance of the formation of a reverse bead along such weld line and which maintains the flexible backing strip in position over the weld line as the reverse bead is formed along the weld line, first means from which the flexible backing strip is passed to the backing locating means, second means which lifts the flexible backing strip progressively off the weld line as formation of the reverse bead along the weld line is completed and support means which holds the backing locating means, the first and the second means relative to a welding head. Provision is made for the backing locating means to comprise a roller, for a sensing means in the form of a thermocouple for controlling the formation of the reverse bead and for a tracking means for positioning the backing locating means relative to the weld line. The invention also includes in its scope the method of one-sided welding including use of the aforementioned apparatus.

5 Claims, 4 Drawing Figures

U.S. Patent
July 25, 1978
4,103,142
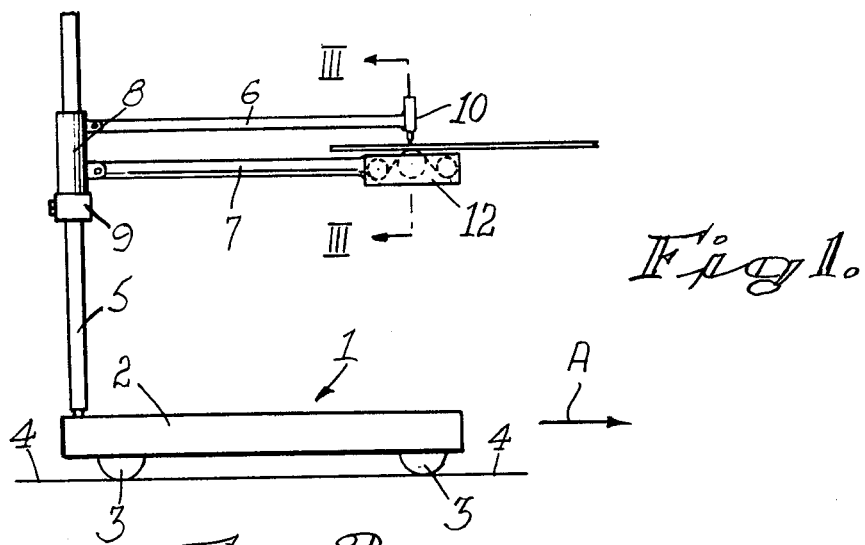
Fig 1.
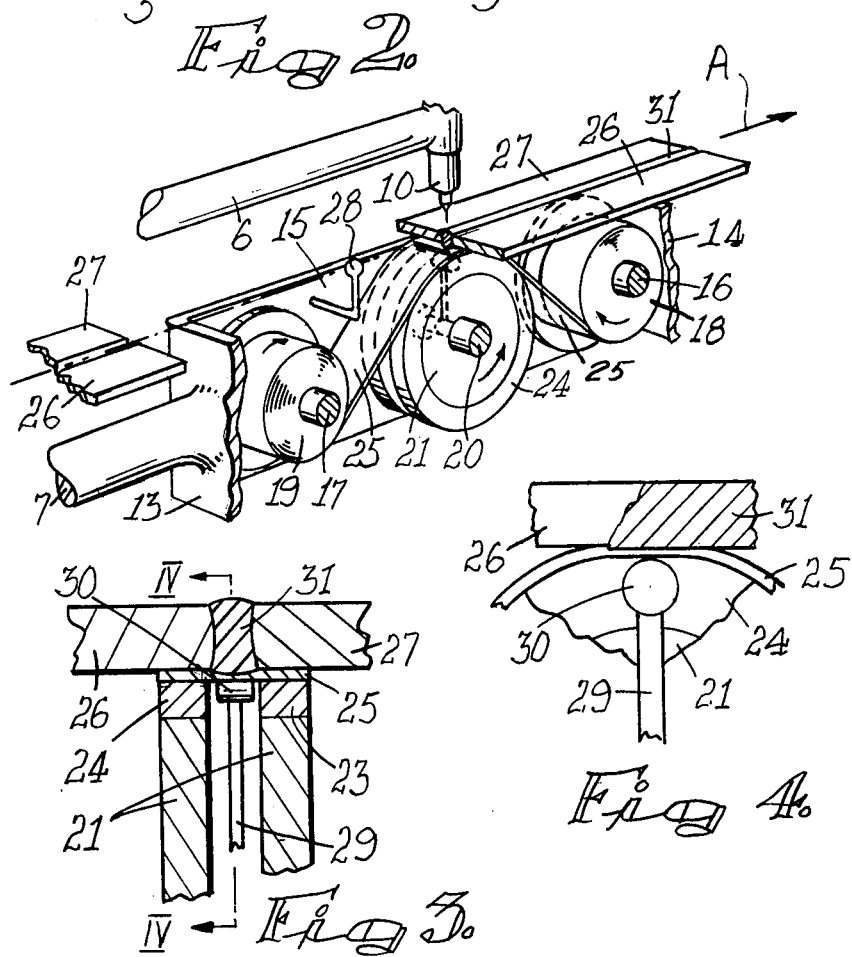
Fig 2.
Fig 3.
Fig 4.

APPARATUS AND METHOD FOR USE IN ONE-SIDED WELDING

FIELD OF THE INVENTION

This invention relates to apparatus and a method adapted for use in welding. More particularly, the invention is concerned with apparatus and a method adapted for use in locating a backing strip in position on the reverse side of a joint during "one-sided" welding operatons, and for controlling the form of the reverse bead during such welding operations.

BACKGROUND TO THE INVENTION

One-sided welding is practiced extensively in such industries as the shipbuilding and boilemaking industries where large plates have to be welded together along abutting edges. Such welding technique is also often used in the manufacture of metal pipes where a metal strip is suitably formed and then welded along abutting edges.

Generally the technique involves aligning the edges of the workpiece or pieces in abutting relationship. A backing may then be located in position on one side of the work piece or pieces to overlie the weld line defined by the joint and then firmly pressed against the abutting edge zones of the work piece or pieces. Such backing may either be of the copper type, the copper flux type, the refractory backed flux type or the powder flux type. In other cases the backing may be located in position on a suitable work bench and the abutting edge zones may be laid on the work bench so that the backing underlies the weld line formed between them.

Alternatively, a suitably shaped refractory backing is used, for instance in the manufacture of pipes, where it is inserted into the pipe confines to underlie the weld line.

The backing may either have a groove extending along its length which is brought into register with the gap between the abutting edges or else the backing may be manufactured to allow the formation of a groove opposite the weld line during the welding operation.

Arc, beam or the like welding apparatus is then passed down along the gap to form a metal bath in the gap. By virtue of the nature of the backing a "reverse" bead is formed on the backing.

In a variation of this technique, the plates are held in overlapping relationship. The backing is then positioned against one of the plates and the arc, beam or the like welding apparatus is moved intermittently down the other plate, along a weld line in register with the backing, to melt the sheets in localized zones along the weld line and thereby bring about welding together of the sheets, as in spot or tack welding, with the difference that a controlled reverse bead is formed.

Such techniques suffer from a number of disadvantages.

In the first place, the backing remains in position over the reverse bead until the entire welding operation has been completed. As a result, the weld can only be inspected once welding has been completed. If, for any reason, there is a breakdown in the apparatus or the apparatus malfunctions, the defect is only discovered once the welding operation has been completed.

Furthermore, the techniques outlined above involve the use of a substantially rigid backing. This has limited the applicaton of the aforementioned techniques to generally straight line welds and, more particularly, over a substantially flat work piece, unless the apparatus is designed for a particular work piece.

Generally, also, pressure is applied to the backing at points intermittent along the length of the backing. Particularly where there are irregularities present in the plate, for instance, differences in thickness or bent positions, leaking or "burn through" may result. Also, the nature of the apparatus employed to date has required accurate alignment of the ends to be welded together. In the case of big plate, such as are encountered in the shipbuilding industry, this has necessitated enormous work benches, all adding to the manufactured cost of the end product.

In order to overcome some of the disadvantages, it is known to provide sensing apparatus which controls, by means of the welding power supply current output, the formation of the reverse bead through measuring radiation from the molten metal formed in the weld itself (such sensing apparatus is disclosed, for instance in U.S. Pat. Nos. 3,299,250 (Vilkas et al.) and 3,335,254 (Vilkas et al.)). Nevertheless; such sensing apparatus suffers from a number of disadvantages.

In the first place, its use is generally limited to one-sided welding techniques involving use of tungsten inert gas where the welding force is of a low magnitude. Where, however, the welding methods used have welding forces of greater magnitudes, such as are involved in metal inert gas welding and submerged arc welding, backings are required which are able to bridle the blow through. Generally the sensing apparatus cannot operate effectively through such backings.

Furthermore, the techniques described in the above-mentioned patent specifications are generally limited to applications where it is possible to track accurately machined joints only with a sensor or to align the sensing device relative to the weld line. These techniques are not possible in the case of rough joints such as are encountered in ship building, boiler making, pipe manufacutre and the like industries where the sensing device may stray from the weld line and give rise to defective welds.

An object of the present invention is the provision of apparatus and a method in which these disadvantages are overcome to a large extent.

SUMMARY OF THE INVENTION

According to the invention there is provided apparatus adapted for use in welding together work pieces along a weld line including backing locating means for applying progressively a flexible backing strip over the weld line in advance of the formation of a reverse bead along such weld line and for maintaining the flexible backing strip in position over the weld line as the reverse bead is formed along the weld line; first means from which a flexible backing strip is passed to the backing locating means; second means for lifting a flexible backing strip progressively off the weld line as formation of the reverse bead along the weld line is completed; and support means for holding the backing locating means, the first and the second means relative to a welding line.

In the case of two plates being welded together in abutting relationship, the weld line is defined by the groove extending along between the plates. Where the plates are in overlapping relationship and are to be welded intermittently along their length, as in spot welding, the weld line is defined by a line taken through the areas of intermittent welding.

The backing locating means may comprise a roller. Preferably such roller has two axially spaced apart rims for applying pressure to the flexible backing strip on each side of the weld line as the flexible backing strip is maintained in position over the weld line. Preferably at least part of the rims are of a resilient material.

In one form of the invention, the first means is adapted to receive a supply spool for the supply of a flexible backing strip to the backing locating means while the second means is adapted to receive a take-up spool for receiving a backing strip as it is lifted progressively off the weld line.

In another form of the invention, the first means comprises guide formations for guiding the flexible backing strip onto the backing locating means. In this form of the invention, the second means comprises guide formations over which the flexible backing strip passes as it is lifted progressively off the weld line. In this form of the invention, the flexible backing strip may be endless.

Still further according to the invention, there is provided sensing means, responsive to the formation of the reverse bead, which is held by the support means for controlling the formation of the reverse bead. Preferably, such sensing means comprises a thermocouple held by the support means for contact with a flexible backing strip as the backing is maintained in position over the weld line by the backing locating means. The thermocouple may be coupled for automatically regulating formation of the reverse bead.

Still further according to the invention, there is provided tracking means adapted to guide the backing locating means along a weld line. Such tracking means may comprise a projecting member adapted to track along an edge of a work piece to be welded.

The support means may include a first arm to which a welding head is mounted, a second arm which holds the backing locating means, the first means and the second means, the thermocouple and the tracking means in position relative to the welding head; and arm supporting means for holding the first arm in a substantially superimposed relationship to the second arm, the first and second arms being adapted to be moved by the tracking means, relative to the arm supporting means, through a substantially horizontal plane, during operation of the apparatus.

The invention is also concerned with a method of welding together workpieces along a weld line including the steps of providing a flexible backing strip, locating progressively the flexible backing strip over a weld line in advance of the formation of a reverse bead along such weld line, maintaining the flexible backing strip in position over the weld line as a reverse bead is formed along the weld line and lifting the flexible backing strip progressively off the weld line as formation of the reverse bead along the weld line is completed.

DESCRIPTION OF THE DRAWINGS

FIG. 1 is a side elevation of the apparatus;
FIG. 2 is a three dimensional view of a carriage and weld head forming part of the apparatus with parts shown broken away;
FIG. 3 is a secton in the line III—III of FIG. 1; and
FIG. 4 is a section in the line IV—IV of FIG. 3.

In the form of the invention shown in the accompanying drawings, there is provided a bench 1 of the kind comprising a chassis 2 having track engaging wheels 3 for controlled movement of the bench 1 along the tracks 4.

The bench 1 is provided with arm support means in the form of a column 5 which supports two substantially parallel horizontally extending arms 6 and 7. These arms 6, 7 are attached to the column 5 by means of a sleeve 8 which passes over the column and which rests on a collar 9 adapted to permit the sleeve 8 to rotate freely relative to the column 5 and thereby permit the arms 6, 7 to swing through a substantially horizontal plane. At the same time, the vertical position of the arms 6, 7 above the bench 1 can be varied by altering the position of the collar 9 along the column 5.

The arms 6, 7 are pivotally mounted to the sleeve and biased in a known manner to swing towards each other.

At the extremity of the upper arm 6 there is provided a conventional welding head 10. This welding head 10 may be of the arc type.

The second arm 7 is provided at its extremity with a boxed construction of a metal plate having side walls 12, 13, 14 and 15. Through the walls of the boxed construction there is provided first and second means in the form of shafts 16, 17 which receive, respectively, a braked supply spool 18 on which is wound a flexible backing strip 25 and a driven take-up spool 19 to which the backing strip is passed. The shafts 16 and 17 are releasably held in walls 12 and 15 to facilitate interchange of the spools 18 and 19.

Where the apparatus is to be used in welding operations involving a low welding force, e.g., in the case of tungsten inert gas techniques, the flexible backing strip 25, which does not form part of the invention, may comprise a stainless steel or tungsten strip, a mild steel strip, which is covered with a ceramic, or a copper strip. Where the apparatus is to be used in welding operations involving a high welding force use may be made of a known solid flux strip.

A further shaft 20 is provided which is mounted in the walls 12 and 15 of the boxed construction and on which is journalled a roller 21. The roller 21 has resilient rims 23, 24, for instance rims manufactured from a suitable high temperature polymer or asbestos composition so that when pressed into firm contact with the backing strip 25 laid on plates 26 and 27, the rims provide a landing (see FIG. 4). In the drawing only a portion of each rim comprises a resilient material. Obviously each entire rim can comprise a resilient material.

In passing from the supply spool 18 to the take up spool 19, the backing strip 25 passes over the roller rims 23, 24 in the manner more specifically shown in FIG. 2.

The apparatus also includes tracking means 28 which comprises a pin mounted on the wall 15 and adapted to extend into the space between two edges of plates 26, 27 to be welded together where it bears against one of such edges.

The apparatus is also provided with a sensing device 29 which is in the form of a thermocouple terminating in a roller 30. During use of the apparatus, the roller 30 travels over the backing strip 25 at a point where it is held against the plates 26 and 27 by roller rims 23, 24.

In use, the two plates 26, 27 to be welded together are located in position on a work bench (not shown) with the adjacent edges suitably positioned relative to each other and aligned approximately to the tracks 4 of the bench.

The bench is then advanced in a known manner along the tracks 4 at a predetermined speed to bring the welding head 10 into operation for forming in a known manner a metal bath between the adjacent edges of the plates. Thus the bench 1 may be provided with an electric motor fitted with a rack arrangement. As a result the roller 21 is moved in under the plates.

Because of the bias applied to the arms 6 and 7 the roller 21 is moved firmly towards contact with the plates 26, 27. Furthermore, the tracking pin 28 engages in the slot between the edges of the plates 26, 27 to locate the roller 21 relative to the weld line defined by the slot so that a roller rim 23, 24 is located on each side of the slot, i.e., the weld line.

If now the roller 21 is advanced in the directon of arrow A along the weld line defined by the slot between the abutting plates, backing strip 25 is drawn off the supply spool 18, laid progressively along the weld line to underlie the weld line and then removed progressively before being taken up on the take-up spool 19. By virtue of the resilient of resilience roller rims 23, 24, a landing is provided which holds the backing firmly in contact with the plate edge zones for part of the length of the backing. The length of such backing in contact with the edge zones of the plate is determined by the diameter of the roller 21, the resilience of the roller rims 23, 24 and the biasing force applied to the arm 7. These parameters are selected to provide a landing of suitable length.

While the roller 21 passes along the weld line, the welding head 10 passes over the top of the plates along the weld line to form a metal bath in the slot between the plates. This metal bath solidifies on the backing strip to form the weld 31. The form of the reverse bead of the weld 31, it will be appreciated, is determined by the shape of the face presented by the backing strip to the edge zones of the plates and the nature of the material from which the backing strip is manufactured. In the case of the backing strip having a slot extending down its length, the reverse bead will assume approximately the shape of such slot.

The position of the roller, relative to the welding head, is so adjusted that the backing strip is positioned below the metal bath to provide a support on which the reverse bead is formed.

A thermocouple 29, suitably held by the arm 7 relative to the point of formation of the reverse bead, picks up temperature characteristics of the reverse bead which are related to the form of the bead. Thus, if the temperature of the reverse bead rises above a predetermined level it means the mass of the metal bath is too big or the depth of penetration of the reverse bead is too great. The problem can be overcome, in the case of submerged arc welding techniques, by increasing the movement of the welding head along the weld line, correcting the welding power supply current output, altering the wire inclination in the welding head or by altering the arc voltage. The converse applies where the temperature of the reverse bead falls below the predetermined temperature. Obviously, corresponding changes can be made in the case of other welding techniques.

The temperature characteristics of the reverse bead, as picked up by the thermocouple 29, may either be fed to a visual or audio relay allowing an operator to adjust the machine to bring the reverse bead into conformity with a desired form or else the thermocouple may feed back information which is related to standard characteristics of the bead and which automatically adjusts the operation of the machine to provide a reverse bead which conforms with a standard type reverse bead.

In this manner a weld of controlled form 31 is formed along the weld line between the edge zones of the plates.

Other forms of the invention exist. For example, instead of advancing the bench 1 along the track, the plates on the work bench can be moved towards the work bench.

The tracking pin 28 need not necessarily be on the wall 15 but can be mounted on the arms 6, 7 or welding head 10. Its function is to position the roller 21 and hence the welding head 10 relative to the weld line formed by the slot between the plate edges. Particularly in the case where the weld line is not a straight line, it will be appreciated that greater tracking accuracy is achieved if it is mounted as close as possible to the roller 21 or the welding head 10. In this regard it will be appreciated that the welding head 10 and roller 21 are "locked" in vertical alignment and that alteration of the position of the welding head 10 automatically moves the roller 21 below it in like manner. If, therefore, the tracking pin 28 is mounted to the welding head 10, its adjustment of the welding head relative to the weld line will cause the roller 21 to be automatically adjusted accordingly.

In the accompanying drawings, the roller is shown mounted fixedly to the arm 7. Obviously, the roller can also be mounted for movement relative to the arm. This can be achieved, for instance, through a screw arrangement that engages a threaded collar so that on rotation of the screw, the roller is advanced along the arm. In this form of the invention, the position of the roller relative to the welding head can be adjusted to suit particular circumstances of reverse bead formation.

Instead of providing a supply spool and a take-up spool, the backing strip may be endless in which case it is drawn by the roller rims over the shaft 16 and returned by the roller 21 over the shaft 17.

The roller as shown in the accompanying drawings may either comprise a unitary structure or else may comprise two halves located co-axially on shaft 20. This latter arrangement, it will be appreciated, permits relative "slip" between the roller halves. In a further arrangement, the roller may be drum-shaped with the resilient rim in the form of a sleeve that fits over the roller. This arrangement suffers, however, from the disadvantage that the thermocouple must either be located ahead of or behind the roller, both of which are not optimum positions from the point of view of obtaining the temperature characteristics of the reverse bead.

Either the entire rim or only portion of the rim may be of a resilient material.

The invention, it is believed, will in use have many advantages over the known forms of welding apparatus.

The tracking arrangement coupled with a backing strip which is laid and lifted progressively over the weld line allows the apparatus to follow an irregular weld line. At the same time, the need to position the work pieces accurately with respect to the weld head is eliminated. This, in turn, allows less sophisticated apparatus to be used in order to obtain the same quality end product and, as a result, a drop in the cost of apparatus and hence of manufacturing the finished product.

By providing a roller having spaced apart roller rims and through using a thermocouple, it is possible to locate sensing apparatus at the most sensitive position for obtaining information on the form of the reverse bead. This, in turn, contributes towards better automatic control of the formation of the reverse bead.

By progressively lifting the backing strip off the workpieces during the welding operation, constant visual inspection of the reverse bead soon after its formation is possible. For this purpose, a picture of the reverse bead may be projected onto a screen by means of a system of mirrors or by means of more sophisticated electronic equipment. In this manner the welding operation can be stopped immediately or corrected manually if any of the automatic adjusting devices should fail.

The disadvantages of a rigid backing underlying the weld line are overcome.

What is claimed is:

1. Apparatus for positioning a flexible backing strip in one-sided welding together of workpieces along a weld line comprising:
    (a) an elongated strip of flexible disposable backing material;
    (b) first means from which the strip is passed to the workpieces;
    (c) second means to which the strip passes from the workpieces; and
    (d) means positioned between said first and said second means for holding the strip to underlie the weld line and against the workpieces, said means comprising circular roller means having round, concentric, resilient outer means for pressing against the side of the strip opposite the weld line to form a landing which bears against the strip.

2. The apparatus of claim 1 in which the strip is in the form of an endless band.

3. The apparatus of claim 1 in which the first means comprises supply means and the second means comprises take-up means.

4. The apparatus of claim 1 in which the round, concentric, resilient outer means comprises two axially spaced-apart tires which contact the strip and apply pressure to it on each side of the weld line.

5. The apparatus of claim 4 including a thermocouple responsive to the formation of a reverse bead on the strip to pick up the temperature characteristics of the reverse bead, the thermocouple being positioned between the two spaced-apart tires for contact with the flexible backing strip.

* * * * *

UNITED STATES PATENT AND TRADEMARK OFFICE
CERTIFICATE OF CORRECTION

PATENT NO. : 4,103,142
DATED : July 25, 1978
INVENTOR(S) : Frederick D. Cartwright It is certified that error appears in the above-identified patent and that said Letters Patent are hereby corrected as shown below:

In Item [56] under OTHER PUBLICATIONS, "Dr. K. Teraland" should read -- Dr. K. Terai and --.

Column 1, line 16, "boilemaking" should be -- boilermaking --.

Column 2, line 10, "plate" should read -- plates --.

Column 5, line 16, delete "resilient of resilience" and insert -- resilience of --.

Signed and Sealed this

Twelfth Day of June 1979

[SEAL]

Attest:

RUTH C. MASON
Attesting Officer

DONALD W. BANNER
Commissioner of Patents and Trademarks